Oct. 7, 1924.
A. P. BARKER
1,511,016
GLASS CUTTING MECHANISM
Filed May 16, 1922    2 Sheets-Sheet 1
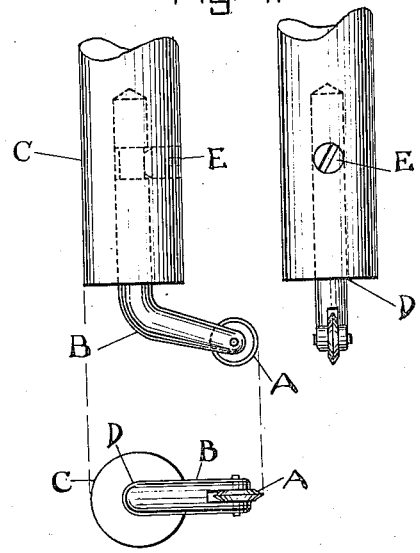
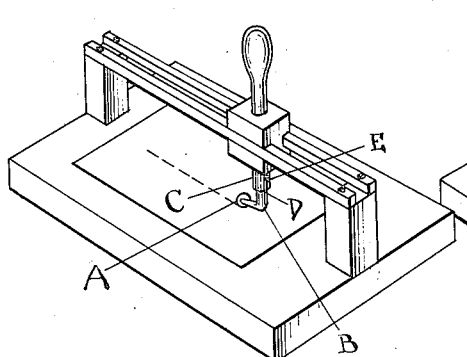
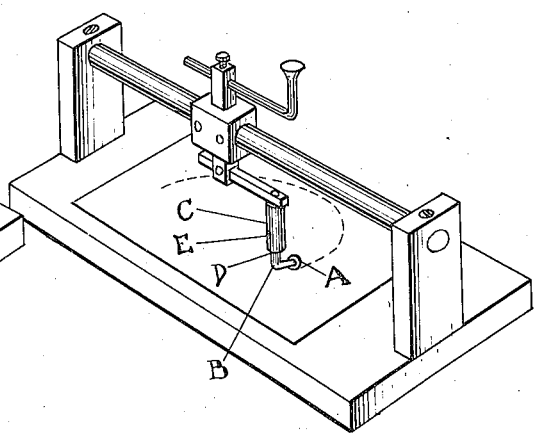
A. Prescott Barker, Inventor:
by
Attorney.

Oct. 7, 1924.

A. P. BARKER 1,511,016

GLASS CUTTING MECHANISM

Filed May 16, 1922  2 Sheets-Sheet 2

A. Prescott Barker, Inventor;

by *[signature]*

Attorney.

Patented Oct. 7, 1924.

1,511,016

UNITED STATES PATENT OFFICE.

A. PRESCOTT BARKER, OF LYNN, MASSACHUSETTS.

GLASS-CUTTING MECHANISM.

Application filed May 16, 1922. Serial No. 561,398.

*To all whom it may concern:*

Be it known that I, A. PRESCOTT BARKER, a citizen of the United States, residing at Lynn, in the county of Essex and Commonwealth of Massachusetts, have invented certain new and useful Improvements in Glass-Cutting Mechanism, of which the following is such a full, clear, and exact description as will enable others versed in the art to which it appertains to make and use the same.

My invention relates to a glass-cutting method involving a mode of acting in manual and mechanical operations, and to a glass-cutting mechanism intended for use with a straight edge guide, with a device for cutting circles, with an ellipsograph for cutting ellipses, or with regular, or irregular, patterns.

The objects of my invention are to extend the range of usefulness and perfection of operation of glass cutters, providing for the cutting of regular and irregular curves, and straight or broken lines, with greater speed and accuracy than has heretofore been possible; to increase the ease of glass cutting operations; to materially lengthen the life of glass cutters; to furnish an improved glass-cutter carriage, turning freely upon or in a pivot so as to allow the cutting element to follow any given course or direction; to furnish an improved form of glass-cutter for use with a straight edge guide, with a device for cutting circles, with an ellipsograph for cutting ellipses, or with regular or irregular patterns, to produce regular or irregular shapes; to provide improved means and methods through manual and mechanical operations producing improved glass cutting results; to prevent a glass-cutting wheel from slipping sidewise in operation, eliminating the resulting damage incidental to such slipping; and to provide means for the rapid reduplication of shapes bounded by lines and curves other than straight and circular.

Figure 4:
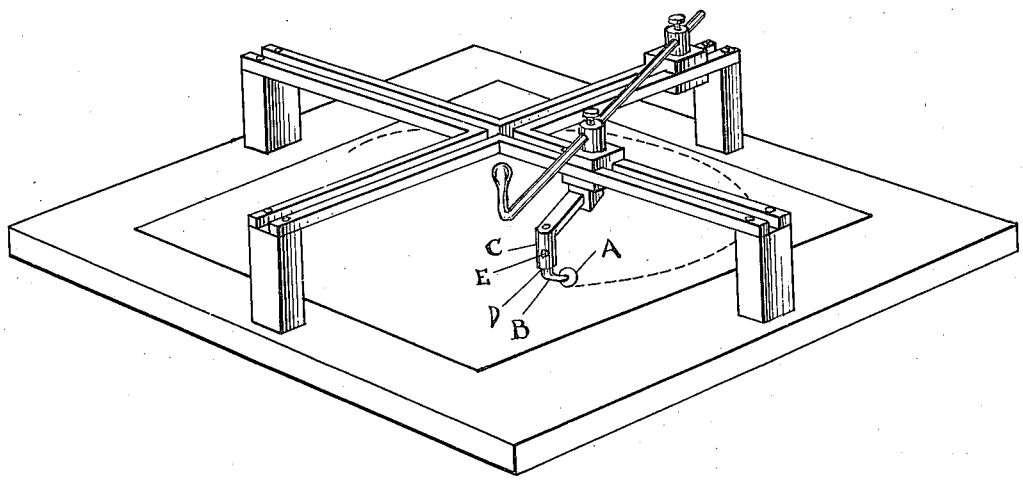
Figure 5:
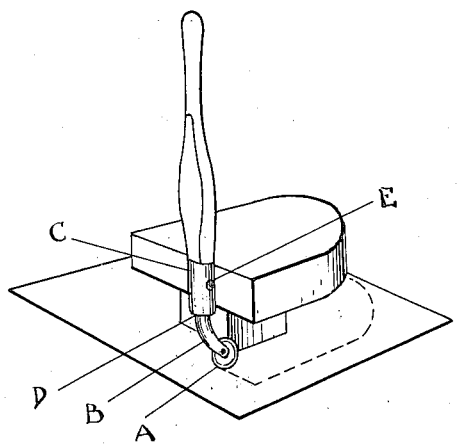
Figure 6:
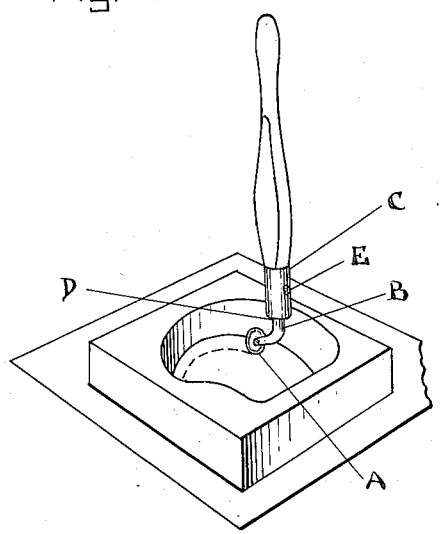

I accomplish the objects of my invention as shown in the accompanying drawings which are illustrative of my device, and of its manual and mechanical operation. Figure 1 shows my improved glass cutting carriage. Figure 2 shows my said glass-cutting carriage as used with a straight edge guide. Figure 3 shows said carriage as used with a device for cutting circles. Figure 4 shows said carriage as used with an ellipsograph. Figures 5 and 6 show said carriage as used with regular, or irregular patterns.

Similar letters of reference refer to similar parts throughout the various views.

In Figure 1, A shows the glass-cutting element mounted in a swinging carriage B, swivelled in the handle C at D. E shows a holding screw the loosening of which allows the dismounting of the carriage. The swivelling of the carriage at D renders the cutting element self-adjusting. In operation the cutting unit trails the handle and is thereby constantly maintained in its most effective cutting position, eliminating all binding and cramping. This trailing action extends the range of usefulness and perfection of operation, increases the ease of operation, materially decreases the wear on the cutting element in use, produces an improved form of glass-cutter for manual and mechanical operation with a straight edge guide, a device for cutting circles, an ellipsograph for cutting ellipses, or regular or irregular patterns. The mounting described, provides an improved rotating carriage, freely turning upon or in a pivot so as to allow the cutting unit to follow the handle in any given course or direction. Those familiar with the art to which my invention appertains well know that a glass-cutting wheel will cut to best advantage only when travelling in the plane in which it rotates. It will not operate when slipping sidewise. It will be noticed that my improved carriage does not take its direction or guidance by contact with, or friction against, a straight edge, circle, ellipse, regular or irregular pattern with which it is used but is led in its most effective cutting position throughout its course. In this respect it radically differs from glass-cutters heretofore used. My device is very efficient when used with overhead guiding or overhead patterns as shown in Figures 4, 5, and 6. Special shapes, oval, parabola, hyperbola, etc., may be cut by means of special machinery which guide the pivot through the determined course and retain the axis about which the carriage swivels perpendicular to the glass. The method involving the use of patterns in some cases requires them to be shaped other than is desired for the cut product. Thus, for instance, in cutting a square corner the pattern must extend beyond the point where the cut is desired, a distance equal to that between the handle and the base of the cutting element in order that the cutting element may follow the handle to the point at which the corner is desired to be cut. A sharp turn in the outline of the pattern then guides the handle in the new direction. All patterns used with my device are formed with this in mind and thus necessarily in varying degrees differ in shape from the cuttings produced. The mode of action, manual and mechanical operations involving the self-adjusting cutting element, and the guidance of the cutting element (other than by its contact with or friction against the device or pattern with which it is used) all as described comprise my improved glass cutting method.

I do not desire to confine myself to the specifically described construction or relative arrangement of parts, inasmuch as future practice of the invention may require such various changes and modifications as can well fall within the scope of my invention as defined in the appended claims.

Having thus described my invention I claim as new and desire to secure by Letters Patent of the United States of America:

1. A glass cutter comprising a handle, a glass-cutting element, a carriage presenting angularly disposed portions, one of which portions is engaged in a socket in the said handle while the other portion engages and supports the said glass-cutting element, the said socket-engaging portion being adapted to turn within the socket and being provided with a circumferential groove, and a holding screw carried by the said handle and mounted in an opening formed in the handle at right angles to the said socket whereby it can be adjusted into and out of the said circumferential groove of the said socket-engaging portion of the said carriage.

2. A glass cutter comprising a handle, a cutting wheel, a carriage presenting angularly disposed portions for engagement with the said handle and the said cutting wheel respectively, the said handle-engaging portion being enclosed for almost its entire extent within a socket in the said handle and the said wheel-engaging portion being adapted to trail the said handle, and releasable means locking the said handle-engaging portion of the said carriage within the socket of the said handle and permitting the said carriage to turn with respect to the said handle for rendering the said cutting wheel self-adjusting.

In testimony whereof I affix my signature in the presence of two witnesses.

A. PRESCOTT BARKER.

Witnesses:
CHARLES W. LOVETT,
DOROTHY F. BISHOP.